United States Patent
Hayakawa et al.

(10) Patent No.: US 7,037,229 B2
(45) Date of Patent: May 2, 2006

(54) HYDRAULIC TENSIONER

(75) Inventors: Hisashi Hayakawa, Shizuoka (JP);
Satoshi Kitano, Shizuoka (JP);
Tomoyoshi Izutsu, Shizuoka (JP);
Kazuo Komori, Shizuoka (JP)

(73) Assignee: NTN Corporation, Osaka (JP)

( * ) Notice: Subject to any disclaimer, the term of this patent is extended or adjusted under 35 U.S.C. 154(b) by 129 days.

(21) Appl. No.: 10/693,503

(22) Filed: Oct. 27, 2003

(65) Prior Publication Data

US 2004/0087399 A1  May 6, 2004

(30) Foreign Application Priority Data

Oct. 28, 2002  (JP)  ............... 2002-312240

(51) Int. Cl.
*F16H 7/08* (2006.01)

(52) U.S. Cl. ..................... 474/110; 474/101

(58) Field of Classification Search ............ 474/101, 474/109, 111, 113, 119, 140; 148/319
See application file for complete search history.

(56) References Cited

U.S. PATENT DOCUMENTS

| | | | | |
|---|---|---|---|---|
| 3,893,848 A | * | 7/1975 | Motoyoshi et al. | ............ 75/234 |
| 5,713,809 A | * | 2/1998 | Yamamoto et al. | .......... 474/110 |
| 6,176,946 B1 | * | 1/2001 | Kuehmann et al. | .......... 148/319 |
| 6,413,179 B1 | * | 7/2002 | Koike | ........................ 474/109 |

FOREIGN PATENT DOCUMENTS

| | | |
|---|---|---|
| JP | 10-325448 | 12/1998 |
| JP | 2002030338 A * | 1/2002 |
| JP | 2002-357250 | 12/2002 |

\* cited by examiner

*Primary Examiner*—Vicky A. Johnson
(74) *Attorney, Agent, or Firm*—Wenderoth, Lind & Ponack, L.L.P.

(57) ABSTRACT

A hydraulic tensioner includes a cylinder having a hollow space filled with hydraulic oil. A plunger is slidably mounted in the cylinder. A pushrod is mounted in the hollow space so as to be axially movable together with the plunger with one end thereof protruding from the cylinder. A spring is mounted in the cylinder to bias the plunger and pushrod outwardly of the cylinder. The plunger is formed with a passage through which a pressure chamber and reservoir chamber communicate with each other. The passage is formed with a valve seat. A check ball is arranged so as to be moved into and out of contact with the valve seat. The check ball is adapted to contact the valve seat when pressure in the pressure chamber exceeds pressure in the reservoir chamber, thereby closing the passage. The valve seat is formed of a steel for carburizing and has a surface carbon concentration of 0.55–0.75% to reduce deposition of carbides and to have a surface hardness at least equal to that of the check ball.

18 Claims, 5 Drawing Sheets

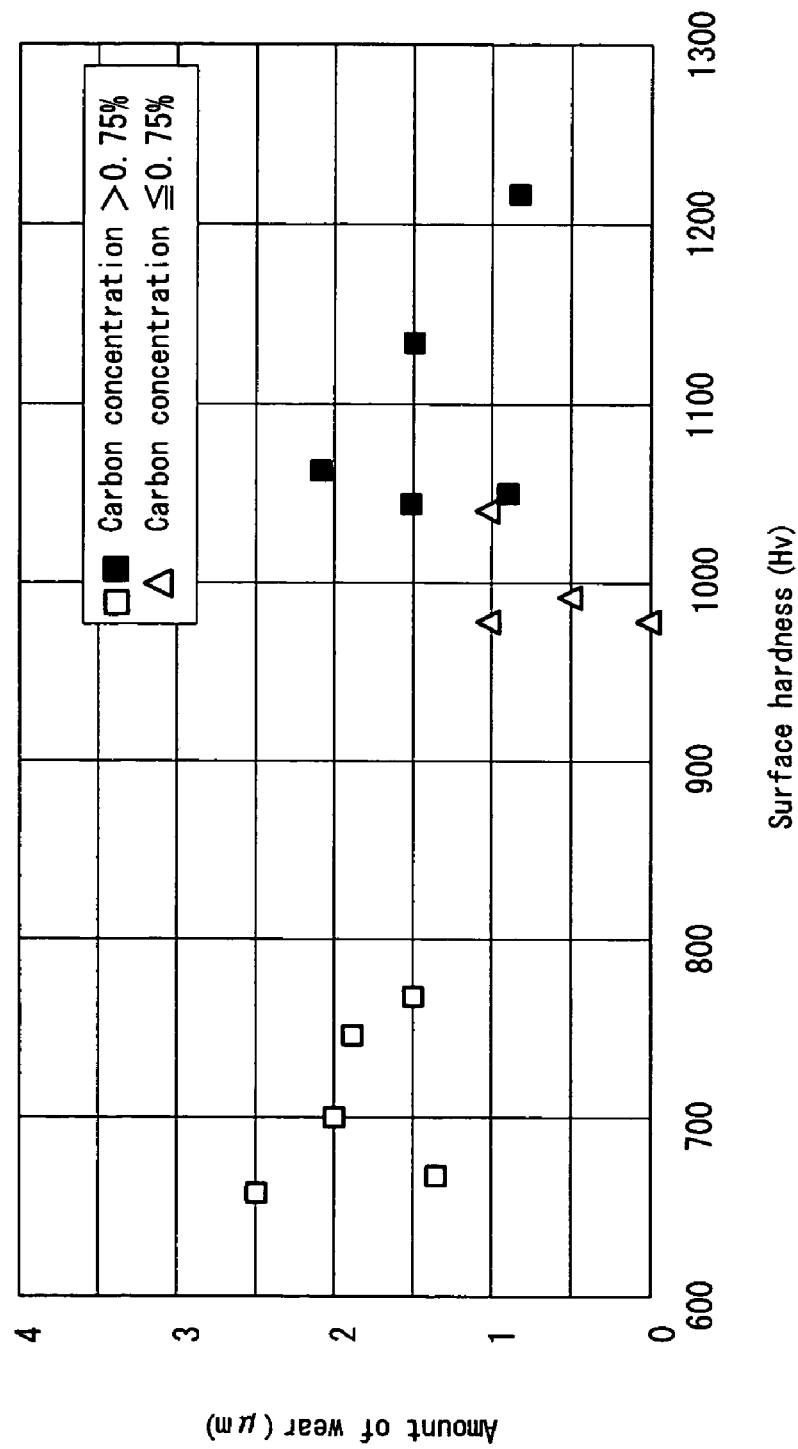

HYDRAULIC TENSIONER

BACKGROUND OF THE INVENTION

This invention relates to a hydraulic tensioner for keeping constant tension in a belt or a chain for driving camshafts.

An ordinary hydraulic tensioner includes a hydraulic damper which bears fluctuating loads applied from a belt or a chain while absorbing vibration of the belt or chain. The hydraulic damper includes a check valve having a check ball which can be moved into and out of contact with a valve seat. When a pushrod or a plunger of the damper is pushed in, the check ball is brought into close contact with the valve seat, thereby sealing a pressure chamber of the damper, which is filled with hydraulic oil, to substantially prevent the hydraulic oil in the pressure chamber from flowing out (as disclosed in FIGS. 12 and 13 of JP patent publication 10-325448).

In such a hydraulic tensioner, from the belt or chain, fluctuating loads are repeatedly applied to the hydraulic damper, thus repeatedly moving the check ball between its closed and open positions, i.e. into and out of contact with the valve seat. Since the check ball and the valve seat repeatedly contact each other, both of them are subjected to treatment for improving wear resistance. Specifically, the check ball is usually formed of a bearing steel and is hardened. The valve seat is usually formed of a forgeable alloyed steel for a mechanical structure such as chrome steel, chrome molybdenum steel or other steel for carburizing, and is carburized and tempered.

If the check ball and the valve seat have the same hardness, the valve seat usually becomes worn locally faster than the check ball because the valve seat is immovable and thus brought into contact with the ball at the same point, while the check ball is brought into contact with the valve seat at different points because the ball can turn. If the valve seat is worn locally, it becomes difficult to stop flow of hydraulic oil because the ball is not in close contact with the seat. Or the check ball may be trapped in the seat and become inseparable from the seat. In either case, life of the tensioner shortens.

To solve this problem, the applicant of this invention has proposed a hydraulic tensioner having a check valve of which the valve seat has a higher hardness than the check ball (JP patent application 2001-166659). In this arrangement, however, depending upon heat treatment conditions of the valve seat, carbides tend to deposit, causing progression of wear. Thus, no significant extension of life of the tensioner, compared with existing ones, was necessarily achieved.

An object of the invention is to improve wear resistance of a valve seat of a check valve in a hydraulic autotensioner, thereby prolonging life of this tensioner.

SUMMARY OF THE INVENTION

According to this invention, there is provided a hydraulic tensioner comprising: a cylinder having a hollow space filled with hydraulic oil; a plunger slidably mounted in a hollow space of the cylinder so as to partition the hollow space into a pressure chamber and a reservoir chamber; a pushrod mounted in the hollow space so as to be axially movable together with the plunger with one end thereof protruding from the cylinder; a spring mounted in the hollow space of the cylinder so as to bias the plunger and the pushrod outwardly of the cylinder, the plunger being formed with a passage through which the pressure chamber and the reservoir chamber communicate with each other, the passage being formed with a valve seat; and a check ball mounted so as to be moved into and out of contact with the valve seat, the check ball being adapted to contact the valve seat when pressure in the pressure chamber exceeds pressure in the reservoir chamber, thereby closing the passage, characterized in that the valve seat is formed of a steel for carburizing and has a surface carbon concentration of 0.55–0.75% after heat treatment.

From another aspect of the invention, there is provided a hydraulic tensioner comprising: a housing formed with a cylinder chamber; a plunger slidably mounted in the cylinder chamber; a pressure chamber defined in the cylinder chamber behind the plunger; a spring mounted in the cylinder chamber for biasing the plunger outwardly of the cylinder chamber; the housing being formed with an oil supply passage so as to communicate with the pressure chamber, and a check valve for preventing hydraulic oil in the pressure chamber from flowing back into the oil supply passage, and the check valve comprising a valve seat formed near an outlet end of the oil supply passage, characterized in that the valve seat is formed of a steel for carburizing and has a surface carbon concentration of 0.55–0.75% after heat treatment.

In forming conventional valve seats by heat-treating a steel for carburizing, heat treatment conditions were such that a surface carbon concentration after heat treatment often exceeded 0.75% and carbides often deposited on the valve seat. According to the present invention, heat treatment conditions are determined such that the surface carbon concentration will not exceed 0.75%, thereby preventing deposition of carbides. But the surface carbon concentration is kept not less than 0.55% so that the valve seat will have a surface hardness substantially equal to that of the check ball which is brought into contact with the valve seat. Wear of the valve seat can thus be effectively reduced.

FIG. 6 is a graph showing test results about a relationship between surface hardness and an amount of wear for specimens of which a surface carbon concentration after heat treatment is between 0.55 and 0.75%, and specimens of which a surface carbon concentration is greater than 0.75%. As will be apparent from the graph, in case the surface carbon concentration is high, even if the surface hardness alone is increased, the amount of wear scarcely decreases due to deposition of carbides. In contrast, by keeping low the surface carbon concentration and thereby avoiding deposition of carbides, the amount of wear can be securely reduced.

The check ball has a surface hardness Hv of about 800. Thus, progression of wear can be further delayed by increasing a surface hardness Hv of the valve seat to be not less than 800.

BRIEF DESCRIPTION OF THE DRAWINGS

Other features and objects of the present invention will become apparent from the following description made with reference to the accompanying drawings, in which:

FIG. 6 is a graph showing a relationship between surface hardness and an amount of wear for different surface carbon concentrations.

DETAILED DESCRIPTION OF THE PREFERRED EMBODIMENTS

Figure 1:
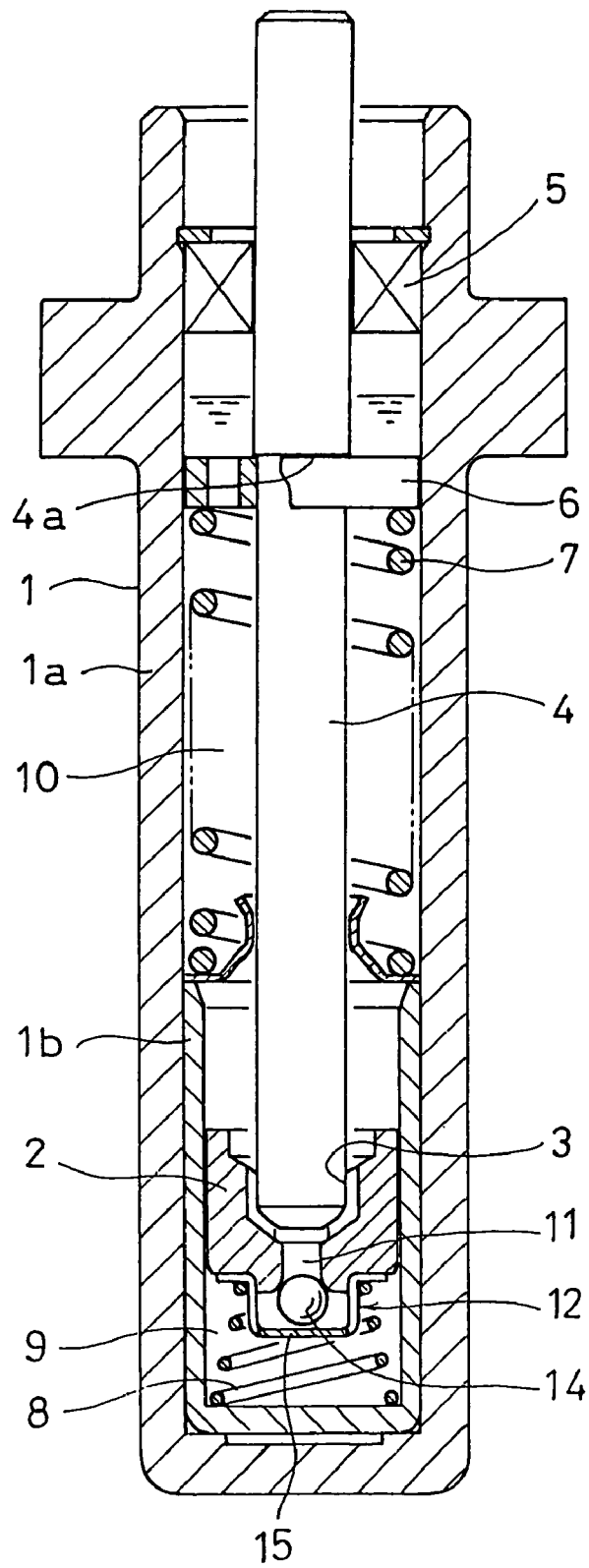
FIG. 1 is a longitudinal sectional front view of a hydraulic tensioner embodying the present invention.
Figure 2:
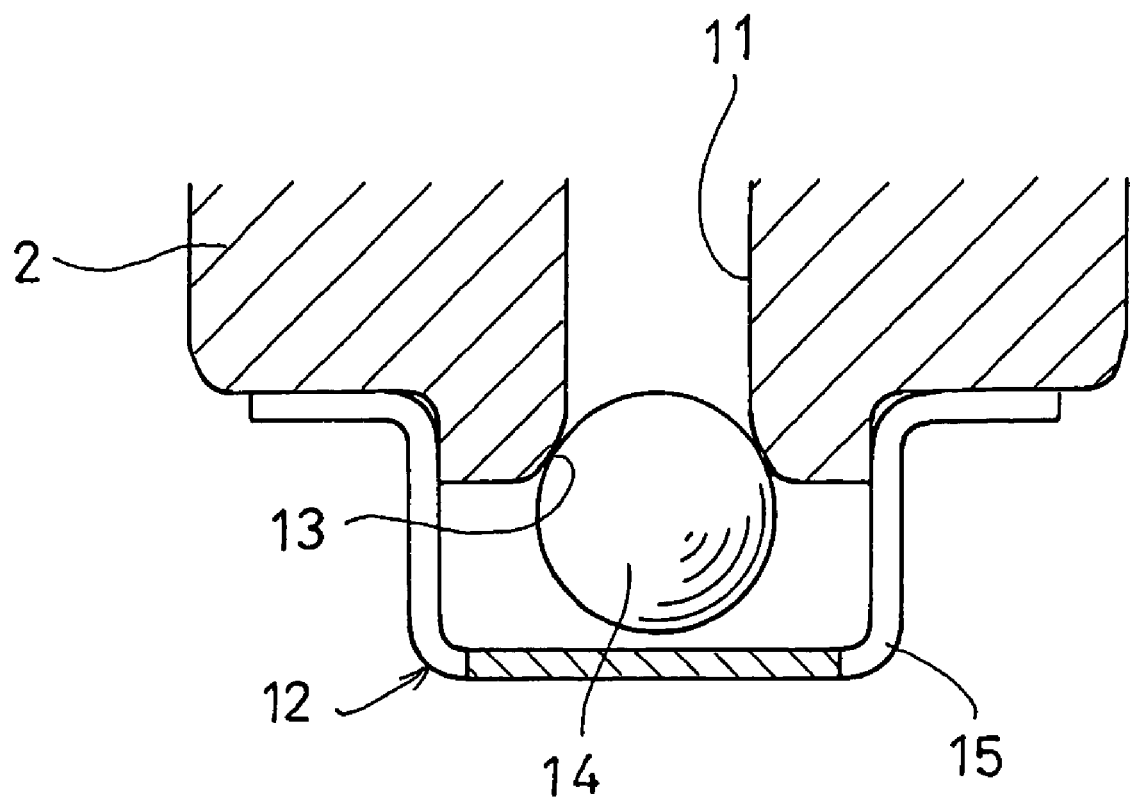
FIG. 2 is an enlarged sectional front view of the hydraulic tensioner of FIG. 1, showing its check valve.

Now embodiments of the invention will be described with reference to FIGS. 1–5. A first embodiment shown in FIGS. 1 and 2 is a hydraulic tensioner for keeping constant tension in a belt. The hydraulic tensioner includes a cylinder 1 comprising an outer sleeve 1a with a bottom, and a valve sleeve 1b received in the outer sleeve 1a. The cylinder 1 is filled with hydraulic oil. A plunger 2 is mounted in the cylinder 1 so as to be slidable along an inner surface of the valve sleeve 1b. In its top surface, the plunger 2 is formed with a recess 3 in which is received a bottom end of a pushrod 4.

The pushrod 4 slidably extends through a seal member 5, such as an oil seal, and has its top end protruding from the cylinder 1. The seal member 5 seals a top opening of the cylinder 1. The pushrod 4 has a shoulder 4a formed on its outer periphery at its portion below the seal member 5. A wear ring 6 is fitted on the pushrod 4 under the shoulder 4a so as to be slidable along an inner surface of the outer sleeve 1a. A spring 7 is mounted between the wear ring 6 and a top end of the valve sleeve 1b to bias the wear ring 6 upwardly and press it against the shoulder 4a. The pushrod 4 is thus biased outwardly of the cylinder 1 by the spring 7.

The plunger 2 partitions an interior of the cylinder 1 into a pressure chamber 9 and a reservoir chamber 10. The plunger 2 is biased upwardly and pressed against a bottom end of the pushrod 4 by a plunger spring 8 mounted in the pressure chamber 9. The pressure chamber 9 communicates with the reservoir chamber 10 through a passage 11 formed in the plunger 2. A check valve 12 for closing a bottom opening of the passage 11 is provided in the pressure chamber 9.

The check valve 12 comprises a retainer 15 and a check ball 14 retained in the retainer 15 so as to be movable in the retainer 15 into and out of contact with a valve seat 13 formed around the bottom opening of the passage 11. The retainer 15 serves to limit a degree of opening. When pressure in the pressure chamber 9 rises above pressure in the reservoir chamber 10, the check ball 14 is seated on the valve seat 13, closing the passage 11.

Since the check ball 14 and the valve seat 13 repeatedly contact each other, both of them are subjected to treatment for increasing wear resistance. In particular, the check ball 14 is formed of a bearing steel and hardened. To increase wear resistance of the valve seat 13, the plunger 2 in its entirety is formed of an alloyed steel for a mechanical structure such as chrome steel, chrome molybdenum steel, or other steel for carburizing. The valve seat 13 is heat-treated (carburizing and tempering) so that a surface carbon content will be in the range of 0.55–0.75, and then is subjected to WPC treatment, which is a kind of shot-peening. These treatments provide a valve seat 13 free of carbide deposition and having a surface hardness Hv of not less than 900.

During this heat treatment of the valve seat 13, carbon content on a surface of the valve seat 13 is controlled by suitably setting a treating time and temperature in each of preheating, soaking, carburizing, diffusion, hardening, sub-zero treatment and tempering steps according to specifications of a furnace used and a number of parts to be heat-treated.

In the WPC treatment, shots of 40–200 micrometers having a hardness equal to or higher than that of the valve seat 13 are blasted against the surface of the valve seat 13 at a speed of not less than 100 m/sec. By repeatedly heating and cooling a surface layer of the valve seat 13 at a rapid pace in a temperature range higher than an A3 transformation point during WPC treatment, the surface of the valve seat is hardened this heat treatment effect and forging effect. At the same time, at the surface layer of the valve seat 13, residual austenite turns into martensite, and its structure is recrystallized and becomes fine. Its hardness and toughness, as well as an internal residual compressive stress, increase.

Instead of the WPC treatment, the surface hardness of the valve seat 13 may be further increased after heat treatment by hard chrome plating, TiN hard film coating, amorphous carbon hard film coating, and the like.

In operation, when tension of a camshaft drive belt (not shown), increases due to variable loads applied from a camshaft and the pushrod 4 is pushed in, the check ball 14 will contact the valve seat 13, closing the passage 11. A downward driving force applied to the pushrod 4 is thus dampened by hydraulic oil trapped in the pressure chamber 9.

If the downward driving force is larger than a sum of force of the spring 7 and that of the plunger spring 8, hydraulic oil in the pressure chamber 9 will be pressurized by the pushrod 4 and leak through a narrow gap defined between contact surfaces of the valve sleeve 1b and the plunger 2, thus allowing the pushrod 4 to slowly descend to a position where the sum of the forces of the springs 7 and 8 balances with the downward driving force applied to the pushrod 4. Thus, a change in the belt tension is absorbed, so that belt tension is kept constant.

When the belt slackens, the plunger 2 and the pushrod 4 are pushed out under a combined force of the spring 7 and the plunger spring 8. The moment the plunger 2 begins to move up, pressure in the pressure chamber 9 decreases below pressure in the reservoir chamber 10. This causes the check ball 14 to instantly separate from the valve seat 13, allowing hydraulic oil in the reservoir chamber 10 to smoothly flow into the pressure chamber 9 through the passage 11. The plunger 2 and the pushrod 4 can thus quickly rise or move outwardly to absorb slack in the belt.

The check ball 14 is freely turnable in the retainer 15, so that it contacts the valve seat 13 at various points. On the other hand, the valve seat 13 contacts the ball at the same point. But in the present invention, since the valve seat 13 is heat-treated such that its surface will be free of carbide deposition and have a surface hardness higher than that of the check ball 14, it is sufficiently wear-resistant so that it will never become worn in a short time.

Thus, even if the belt vibrates at a high frequency due to vibration transmitted from an engine through camshafts and thus the check valve is repeatedly opened and closed at short intervals, the valve seat is less likely to be worn in a short time. This effectively prevents malfunction of the check valve and other trouble, and prolongs a life of the check valve and thus the tensioner in its entirety.

Figure 3:
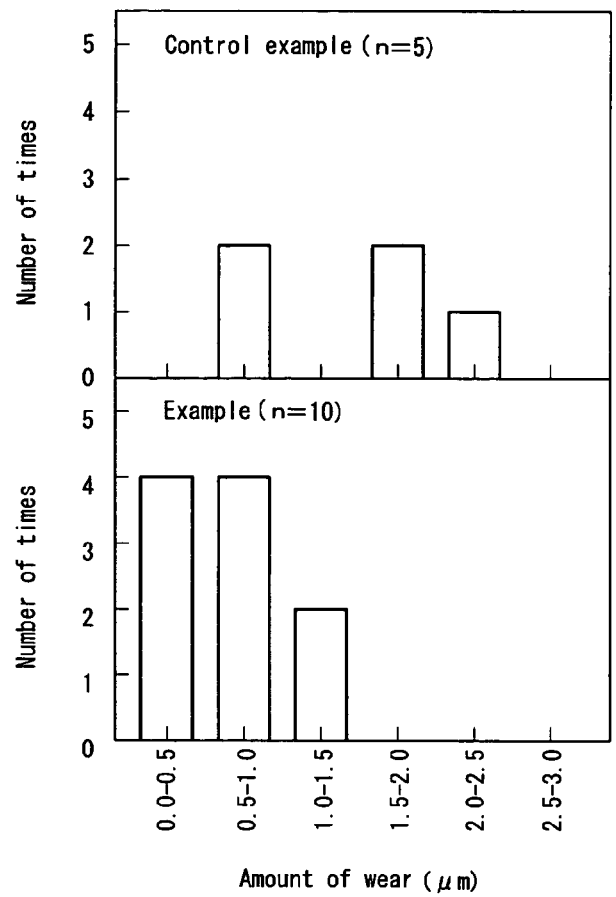
FIG. 3 is a graph showing wear test results for a valve seat on the check valve.
Figure 4:
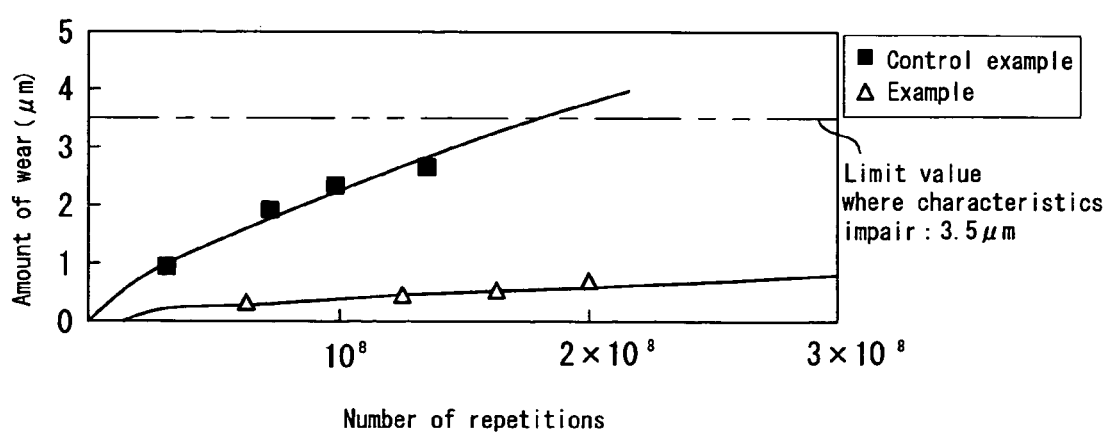
FIG. 4 is a graph showing results of another wear test for the valve seat on the check valve.

To confirm an effect of improving the wear resistance, test specimens were subjected to a wear resistance test. Some of the specimens were plungers made of a chrome steel and formed with a valve seat which was subjected to conventional heat treatment so that its surface carbon concentration would be at least 0.76% (Control Specimens). Other specimens were plungers formed with a valve seat having a surface carbon concentration adjusted to 0.55–0.75% by suitably setting heat treatment conditions (Specimens of the invention). Test results are shown in FIGS. 3 and 4. It was confirmed that no carbon deposition was observed on a surface of Specimens of the invention, whereas carbon deposition was observed on the Control Specimens. Both specimens were subjected to WPC treatment. Then, a ball made of a bearing steel and having a surface hardness Hv of 800 was repeatedly pressed against a valve seat surface of each specimen under a predetermined load.

FIG. 3 shows an a mount of wear on the valve seat surface when a ball was pressed against each specimen a predetermined number of times. FIG. 4 shows how an amount of wear of the valve seat increases for respective specimens. These test results clearly indicate that the Specimens of the invention are far superior in terms of wear resistance. This means that the tensioner of the present invention has a far longer life than conventional tensioners.

Figure 5:
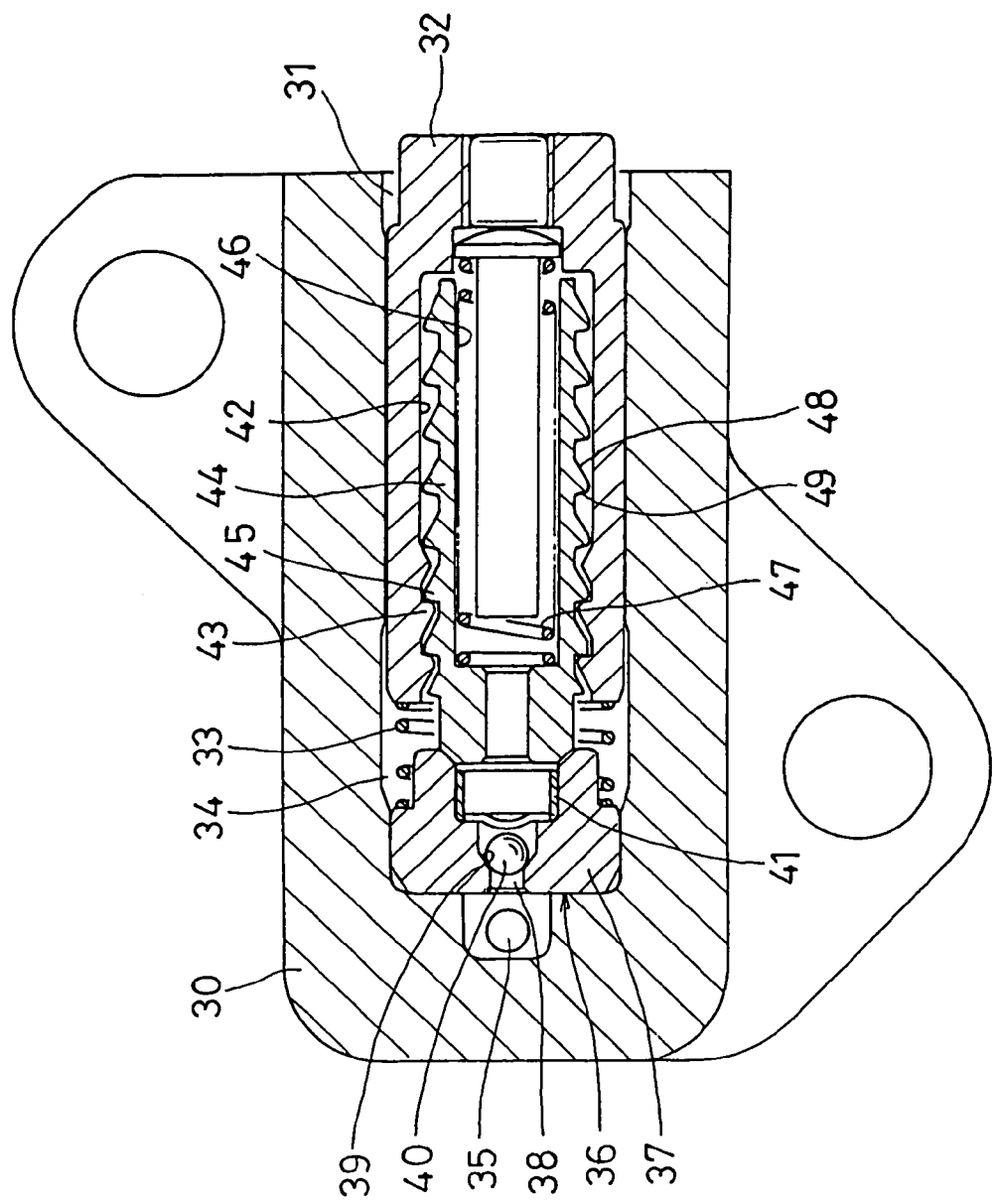
FIG. 5 is a longitudinal sectional front view of a hydraulic tensioner of another embodiment.

The check valve of the present invention can be used not only in a hydraulic tensioner for adjusting tension in a belt as shown and described above, but also in a chain tensioner as shown in FIG. 5.

The chain tensioner shown in FIG. 5 includes a housing 30 having a cylinder chamber 31 in which is slidably received a plunger 32 which is biased outwardly by a spring 33 mounted in a pressure chamber 34 defined in the cylinder chamber 31 behind the plunger 32. An oil supply passage 35 is formed in a bottom of the housing 30 to supply hydraulic oil from a hydraulic oil source into the pressure chamber 34. A check valve 36 is provided at an outlet of the passage 35 to prevent hydraulic oil in the pressure chamber 34 from flowing back into the passage 35.

The check valve 36 comprises a valve seat member 37 formed with a passage 38 through which the pressure chamber 34 communicates with the oil supply passage 35, and a check ball 40 retained by a retainer 41 so as to be movable into and out of contact with a valve seat 39 formed on an inner wall of the passage 38. The passage 38 is closed when the check ball 40 is in contact with the valve seat 39. The retainer 41 serves to limit a degree of opening of the check valve 36.

The plunger 32 is formed with an axial hole 42 having a closed front end and formed with female threads 43 near its rear opening. A screw rod 44 is inserted in the axial hole 42 with male threads 45 on an outer periphery thereof in engagement with the female threads 43 of the axial hole 42. The screw rod 44 is formed with an axial hole 46 having a bottom shoulder. A compression spring 47 is mounted in the hole 46 between a bottom shoulder of the hole 46 and a closed upper end of the hole 42 to bias the plunger 32 and the screw rod 44 in opposite directions.

The threads 43 and 45 are serration-shaped with their pressure flanks 48, which bear a push-in load applied to the plunger 32, having a greater flank angle than their clearance flanks 49. Of course, the threads 43 and 45 have such a lead angle that the screw rod 44 can move axially relative to the plunger 32 while turning.

With this chain tensioner, the plunger 32 is pressed against a chain (not shown) under a combined force of the spring 47 and the spring 33. When the chain slackens, the plunger 32 is pushed out mainly under a force of the spring 33 to absorb slack in the chain.

When the chain slackens and the plunger 32 is pushed out, the screw rod 44 is also moved axially together with the plunger 32, thereby being removed from the valve seat member 37. This causes a sudden drop in pressure in the pressure chamber 34, which in turn causes the check ball 40 to come off the valve seat 39. Hydraulic oil thus flows through the oil supply passage 35 into the pressure chamber 34. The plunger 32 can thus rise smoothly. When tension in the chain increases and the plunger 32 stops, the screw rod 44 will retract while rotating under force of the spring 47 until it touches the valve seat member 37.

When tension of the chain increases and a downward push-in force is applied to the plunger 32, pressure in the pressure chamber 34 increases, causing the check ball 40 to be seated on the valve seat 39 and closing the passage 38. The downward push-in force applied to the plunger 32 is thus dampened by the hydraulic oil in the pressure chamber 34 and a force of the spring 33.

If the push-in force is larger than the combined force, oil in the pressure chamber 34 will leak through a narrow gap between an inner wall of the cylinder chamber 31 and a surface of the plunger 32 that is in sliding contact with the inner wall of the cylinder chamber 31, and the plunger 32 will retract slowly while rotating, until the downward push-in force applied to the plunger 32 balances with the combined force of the springs 33 and 47.

With this chain tensioner, also, the valve seat 39 is formed of a steel for carburizing and is heat-treated under such conditions that a surface carbon concentration will be 0.55–0.75%. The valve seat 39 is thus highly wear-resistant.

According to the present invention, by reducing carbon deposition on the valve seat and controlling carbon concentration after heat treatment to 0.55–0.75%, the valve seat has a surface hardness equal to or higher than the check ball and thus is highly wear-resistant. This extends a life of the hydraulic tensioner using this check valve.

What is claimed is:

1. A hydraulic tensioner comprising:
   a cylinder having a hollow space to be filled with hydraulic oil;
   a plunger slidably mounted in said hollow space so as to partition said hollow space into a pressure chamber and a reservoir chamber, said plunger having a passage through which said pressure chamber and said reservoir chamber communicate with each other, said passage defining a valve seat formed of a steel for carburizing, said steel comprising a forgeable alloyed steel for a mechanical structure, said valve seat having a surface carbon concentration of from 0.55%–0.75% after heat treatment, and there being no deposition of carbides on the surface of said valve seat after the heat treatment;
   a pushrod mounted in said hollow space so as to be axially movable together with said plunger, said pushrod having one end thereof protruding from an end of said cylinder;
   a spring mounted in said hollow space so as to bias said plunger and said pushrod in a direction toward said end of said cylinder; and
   a check ball movable into and out of contact with said valve seat, said check ball being adapted to move into contact with said valve seat when pressure in said pressure chamber exceeds pressure in said reservoir chamber so as to close said passage.

2. The hydraulic tensioner according to claim 1, wherein said valve seat has a surface hardness Hv of not less than 800.

3. The hydraulic tensioner according to claim 2, wherein said surface hardness of said valve seat is at least equal to a surface hardness of said check ball.

4. The hydraulic tensioner according to claim 3, wherein said forgeable alloyed steel for a mechanical structure comprises a chrome steel.

5. The hydraulic tensioner according to claim 3, wherein said forgeable alloyed steel for a mechanical structure comprises a chrome molybdenum steel.

6. The hydraulic tensioner according to claim 2, wherein said forgeable alloyed steel for a mechanical structure comprises a chrome steel.

7. The hydraulic tensioner according to claim 2, wherein said forgeable alloyed steel for a mechanical structure comprises a chrome molybdenum steel.

8. The hydraulic tensioner according to claim 1, wherein said forgeable alloyed steel for a mechanical structure comprises a chrome steel.

9. The hydraulic tensioner according to claim 1, wherein said forgeable alloyed steel for a mechanical structure comprises a chrome molybdenum steel.

10. A hydraulic tensioner comprising:
a housing having a cylinder chamber;
a plunger slidably mounted in said cylinder chamber;
a pressure chamber defined in said cylinder chamber behind said plunger, said housing having an oil supply passage so as to communicate with said pressure chamber;
a spring mounted in said cylinder chamber for biasing said plunger outwardly of said cylinder chamber; and
a check valve for preventing hydraulic oil in said pressure chamber from flowing back into said oil supply passage, said check valve having a valve seat near an outlet end of said oil supply passage, said valve seat being formed of a steel for carburizing, said steel comprising a forgeable alloyed steel for a mechanical structure, said valve seat having a surface carbon concentration of from 0.55%–0.75% after heat treatment, and there being no deposition of carbides on the surface of said valve seat after the heat treatment.

11. The hydraulic tensioner according to claim 10, wherein
said valve seat has a surface hardness Hv of not less than 800.

12. The hydraulic tensioner according to claim 11, further comprising:
a check ball movable into and out of contact with said valve seat,
wherein said surface hardness of said valve seat is at least equal to a surface hardness of said check ball.

13. The hydraulic tensioner according to claim 12, wherein
said forgeable alloyed steel for a mechanical structure comprises a chrome steel.

14. The hydraulic tensioner according to claim 12, wherein
said forgeable alloyed steel for a mechanical structure comprises a chrome molybdenum steel.

15. The hydraulic tensioner according to claim 11, wherein
said forgeable alloyed steel for a mechanical structure comprises a chrome steel.

16. The hydraulic tensioner according to claim 11, wherein
said forgeable alloyed steel for a mechanical structure comprises a chrome molybdenum steel.

17. The hydraulic tensioner according to claim 10, wherein
said forgeable alloyed steel for a mechanical structure comprises a chrome steel.

18. The hydraulic tensioner according to claim 10, wherein
said forgeable alloyed steel for a mechanical structure comprises a chrome molybdenum steel.

* * * * *